June 9, 1931.  J. H. GODFREY  1,809,116
MILK HEATER
Filed Sept. 29, 1927   3 Sheets-Sheet 2
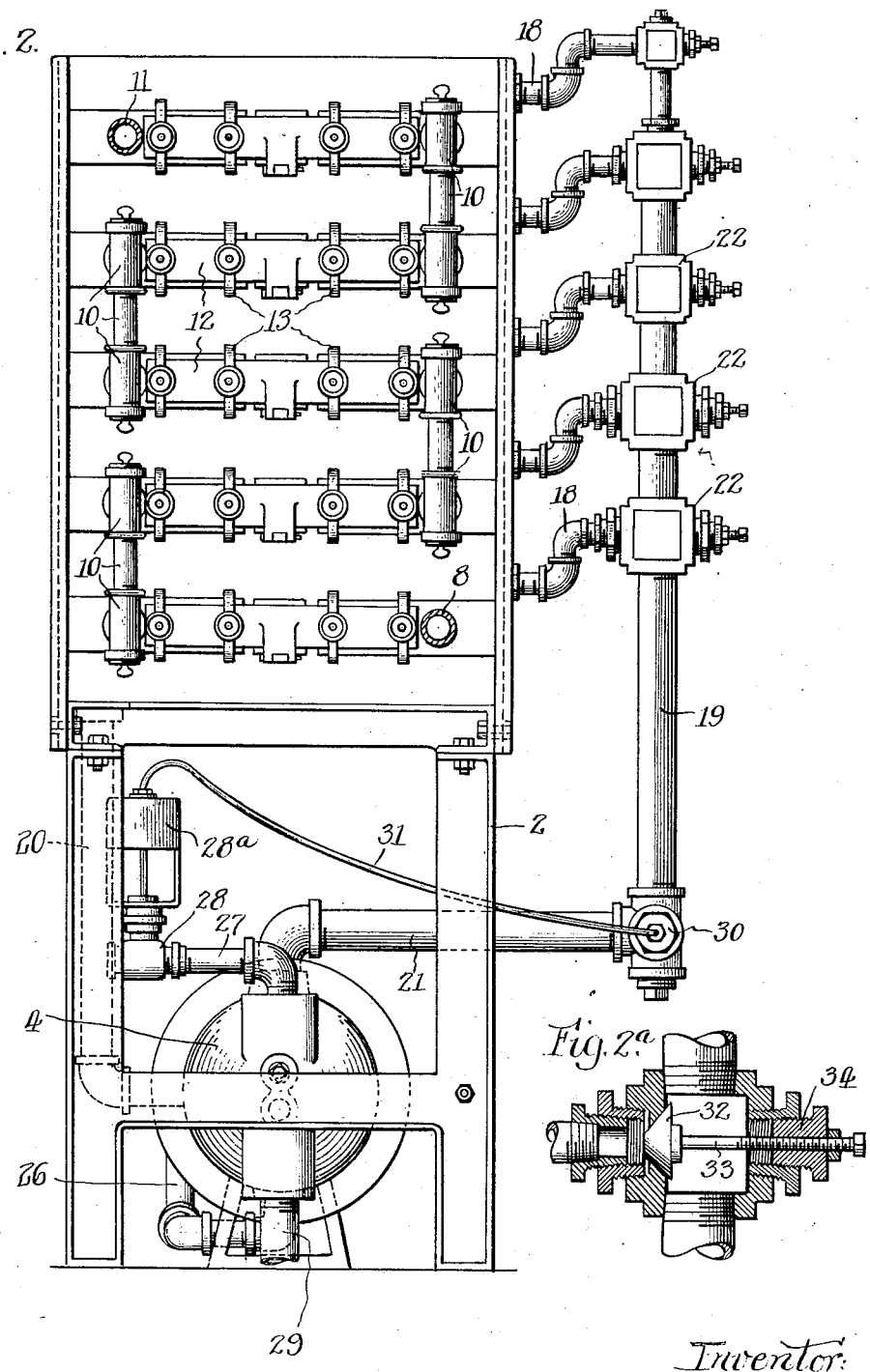
Inventor:
Joseph H. Godfrey,
By Chindahl Parker Carlson
Attys.

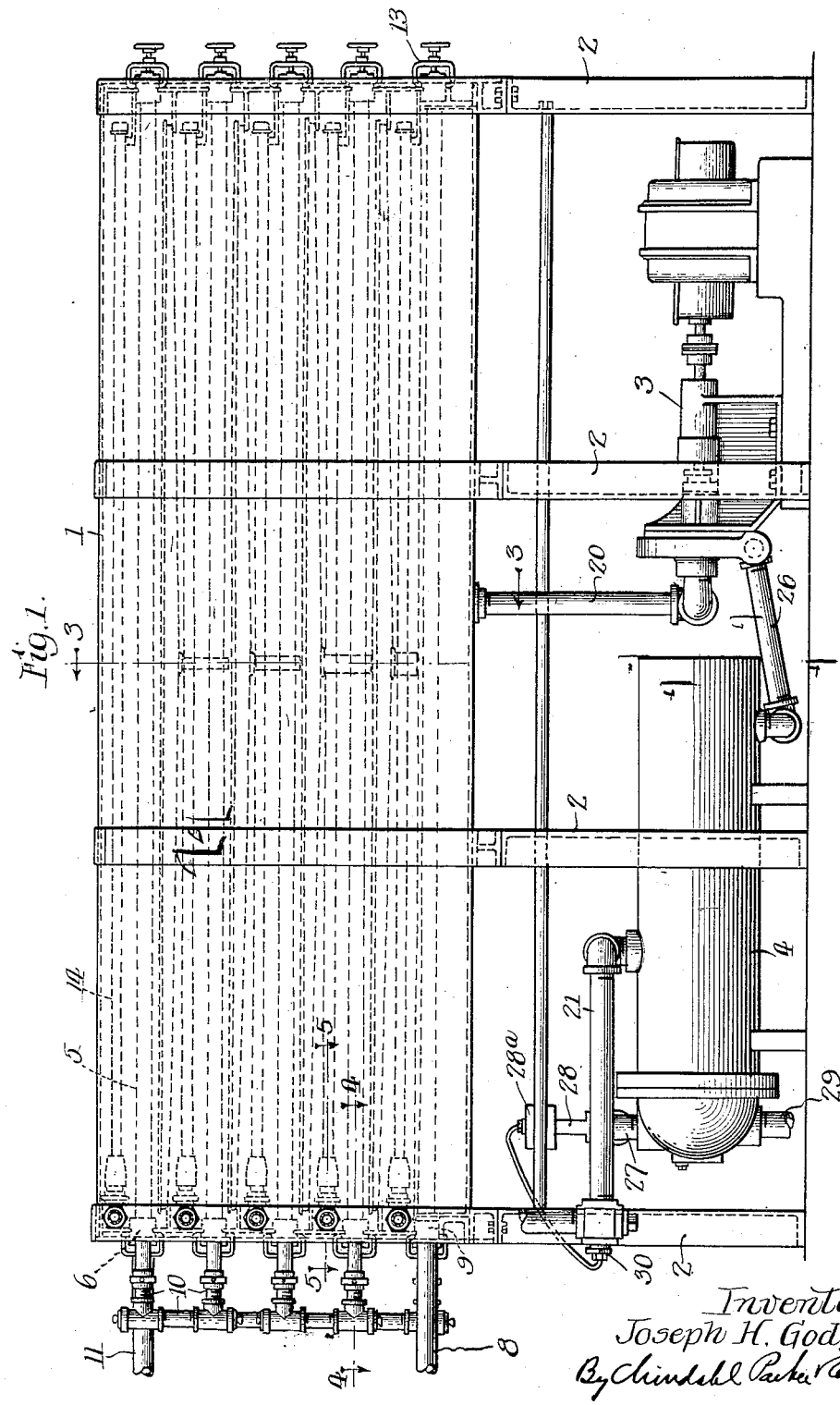

June 9, 1931.  J. H. GODFREY  1,809,116
MILK HEATER
Filed Sept. 29, 1927  3 Sheets-Sheet 3
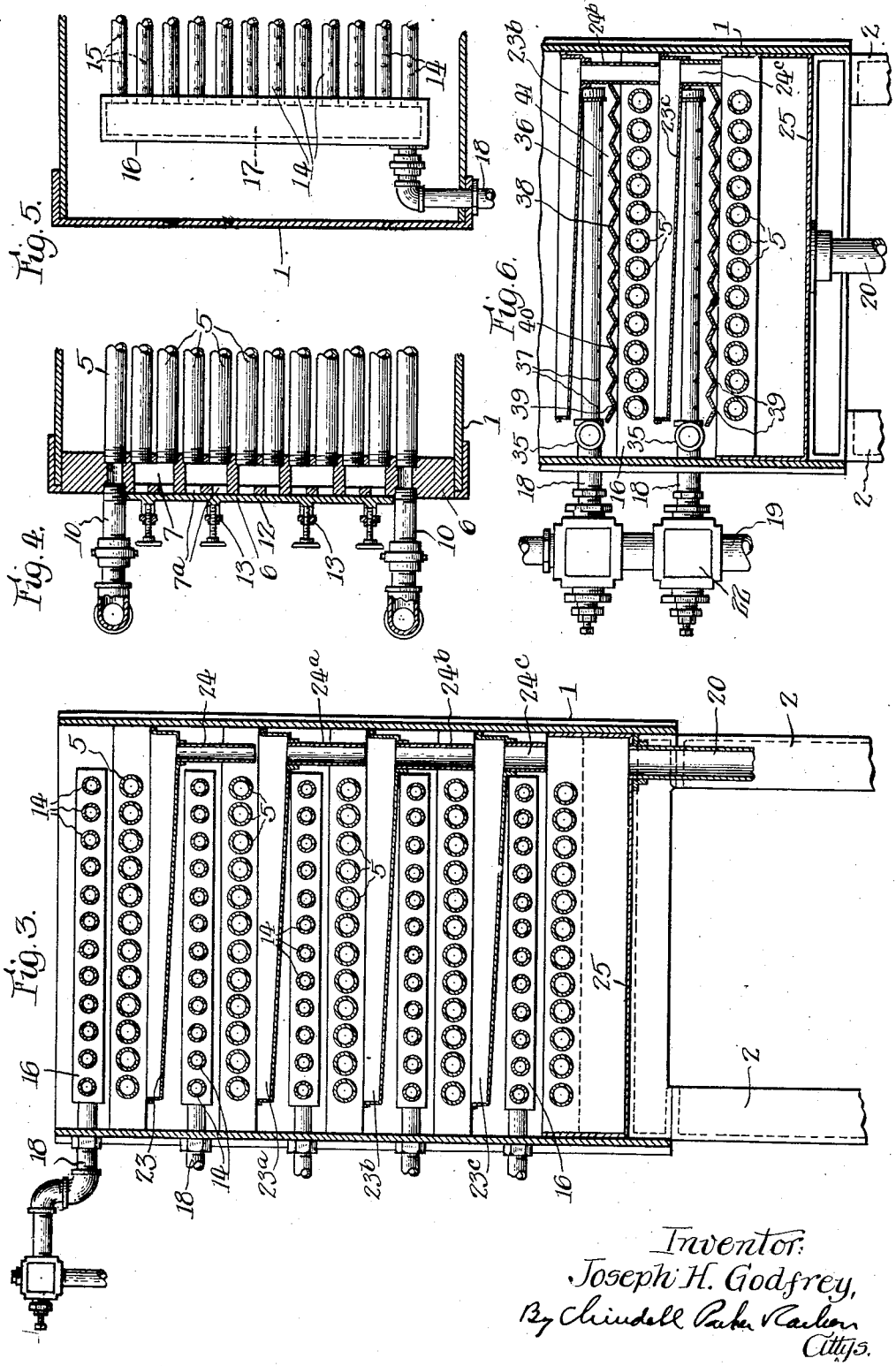
Inventor:
Joseph H. Godfrey,
By Chindell Parker Carlson
Attys.

Patented June 9, 1931

1,809,116

UNITED STATES PATENT OFFICE

JOSEPH H. GODFREY, OF CHICAGO, ILLINOIS, ASSIGNOR TO THE CREAMERY PACKAGE MFG. COMPANY, OF CHICAGO, ILLINOIS, A CORPORATION OF ILLINOIS

MILK HEATER

Application filed September 29, 1927. Serial No. 222,758.

This invention relates generally to heaters and more particularly to an automatically controlled heater for use in pasteurizing milk.

In the process of pasteurizing it is desirable to heat the milk after it is taken from the cold storage and before it is passed on to the holder, to raise the milk from the storage temperature up to the desired pasteurizing temperature so that when the milk is passed on into the holder it is already at the desired temperature.

To perform this portion of the process efficiently it is necessary not only to heat the milk quickly to the desired pasteurizing temperature, but also to maintain the temperature of the milk leaving the heater at a practically constant degree. In various types of heaters used heretofore considerable difficulty has been experienced in maintaining uniform temperature of the milk delivered from the heater, generally because of the variation in the intake temperature of the milk from the cold storage, no effective means having been provided whereby the heating medium could be controlled automatically so as to keep the final temperature of the milk constant.

It is the general object of the invention to provide a heater of new and improved construction adapted to hold the final temperature of the milk within very close limits.

Another object of the invention is to provide a heater wherein the temperature of the heating medium is kept constant and the medium is admitted to the heater in a plurality of stages.

Another object is to provide a heater having a plurality of milk tubes and a plurality of heating water pipes, together with a means to heat the water and a plurality of connections between said heating means and said water pipes.

Another object is to provide a heater wherein a heating medium at an automatically regulated constant temperature is admitted to the heater at a plurality of stages so that the milk flowing through the heater approaches the temperature of the heating medium as a maximum.

Other objects and advantages will become apparent as the description proceeds.

In the drawings:

Figure 1 is a side elevation of a preferred form of the invention.

Fig. 2 is an end view thereof.

Fig. 2ª is a central section through one of the valves shown in Fig. 2.

Fig. 3 is a section along the line 3—3 of Fig. 1.

Fig. 4 is a section along the line 4—4 of Fig. 1.

Fig. 5 is a section along the line 5—5 of Fig. 1.

Fig. 6 is a fragmental section similar to Fig. 3 of a modified form of the invention.

While my invention is susceptible of embodiment in many different forms there has been shown in the drawings and will herein be described in detail one such embodiment together with a modification thereof, with the understanding that the present disclosure is to be considered as an exemplification of the principles of invention and is not intended to limit the invention to the embodiment illustrated. The scope of the invention will be pointed out in the appended claims.

In the form chosen for the purpose of disclosure the invention comprises generally a heater body contained in a casing 1, which body is supported by means of a plurality of upright standards 2, together with a direct connected motor driven circulating pump unit 3 and a water heater 4 positioned under said casing and intermediate the standards.

Within the casing milk tubes 5 are arranged in a plurality of vertically spaced and horizontally extending tiers. At the opposite ends of the tubes headers 6 are provided which contain suitable ports 7 connecting the ends of adjacent tubes so as to provide a single and continuous passageway through each tier of tubes. An intake pipe 8 is preferably provided for the milk in the lowermost header at one end of the casing, the header having a port 9 connecting said pipe with the intake end of the milk passage through the tubes. The other end of the milk passage through the lower tier of pipes is connected to the adjacent end of the passage through the next higher tier by means of suitable pipes and fittings designated generally as 10. Similar connections are made between the other tiers of tubes so that milk entering through the intake 8 passes through a single continuous passageway through the heater and out through an outlet pipe 11 extending from the uppermost tier. As illustrated most clearly in Figs. 1 and 4, the headers 6 are preferably provided with removable cover plates 12 and suitable clamping devices 13 so as to permit ready access to the tubes for cleaning purposes through ports 7ª. To heat the milk as it passes through the tubes the invention contemplates the spray application of water of uniform temperature to the tubes substantially throughout their length, and the withdrawal of the spent water therefrom after its first application. In the exemplary form illustrated herein, a plurality of heating medium or water pipes 14, herein illustrated as equal in number to the number of milk tubes, are positioned parallel to and immediately above them. These pipes are provided with a plurality of spray apertures 15 (Fig. 5) in the bottom thereof arranged to discharge the heating medium onto the milk tubes. The milk tubes and the water pipes preferably are so arranged that the water sprayed upon any of the tubes drains therefrom without flowing over any other tube.

The water pipes are provided with headers 16 at one end of each tier, these headers having preferably common passages 17 therein communicating with the pipes, the headers being provided with intake pipes 18 fed from a common riser 19, and the pipes 14 at the opposite end of the casing being closed. Means such as hereinafter described may be provided to collect the heating medium and return it to the intake pipe 20 on the circulating pump 3.

The riser 19, which is connected by means of a pipe 21 to the outlet of the hot water heater 4 is herein shown connected directly to each tier of water pipes, and to permit of efficient operation and control, independent valves 22 are provided one for each tier. The riser may be constructed in sections suitably stepped down in size as shown most clearly in Fig. 2, and thereby permit of economic construction.

By thus feeding the heating water at uniform maximum temperature to each tier section of the heater, there is no danger of overheating the milk by reason of excessively hot water being admitted to a single inlet for an entire system of successively connected water pipes, as has been customary heretofore in such heating apparatus. In the former tubular milk heaters, excessively hot water has been applied to the tubes containing the milk, and it has been attempted in the former structures to so balance the excessively hot water against the cold milk that, with the exchange of heat during the flow of the milk through the heater in counter direction to the flow of heating water, the milk will have reached the desired temperature at the moment of its discharge from the heater. It will be obvious that varying temperatures in the stream of incoming milk will be reflected in like variations in the temperature of the discharged milk, with the result that the milk is excessively heated or is not sufficiently heated.

In the present invention the several stages of heating, each maintained at the desired maximum temperature for the discharged milk, assures a precise uniformity of temperature in milk passed on to the holders which is necessary to proper pasteurization, and accomplishes such uniformity of final temperature without effect by such changes of temperatures in the incoming milk as may occur in practical operation.

In order to drain the water from the casing 1 and return it to the circulating pump through the pipe 20, a plurality of drip pans 23, 23ª, 23ᵇ, etc., are provided one for each tier of the heater so as to collect the water individually from each group of milk tubes. These drip pans may have sloping bottoms provided with outlet pipes 24, 24ª 24ᵇ, etc., positioned one above the other (see Fig. 3), the outlet pipes being preferably increased in size in the lower tiers to permit of ready passage of the water from each pan and from those above it. The lowermost drip pan 25 is made of substantially greater size so as to be capable of receiving the water from the upper drip pans when the circulating pump is stopped.

The water heater 4 may be of any preferred form, that shown herein being of a type having a steam heating coil within the heater casing. A water intake pipe 26 for the heater, is herein shown connected to the discharge port of the pump 3, and the water outlet of the heater is connected to the riser 19 through the hereinbefore mentioned pipe 21. This type of heater is provided with a circulating steam coil (not shown) having an intake pipe 27 provided with an automatically operated control valve 28 and an exhaust pipe 29. The valve 28 which may be of any preferred form arranged for thermostatic control, is adapted to be operated by means of a thermostat 30 positioned in the riser 19 and connected to the valve operating mechanism 28ª by means of a suitable connection 31.

When the heater is in operation, milk is circulated through the tubes 5, the intake pipe 8 receiving milk from a cold storage and the outlet pipe 11 discharging the heated milk into a holder. With the pump 3 in operation and steam supplied on the intake side of the valve 28 the hot water from the heater 4 is passed through the riser 19 and independently through the pipes 18 into the headers 16 and water pipes 14, the water being discharged through the apertures 15 onto the milk tubes. After being applied to the tubes the water drains through the pans 23, 23ª etc., and outlets 24, 24ª etc., into the pan 25, from whence it passes back to the circulating pump through the pipe 20. The valves 22 (Figs. 2 and 2ª) are herein shown as being of a manually adaptable type having conical valve members 32 operable by means of screw threaded stems 33 mounted in suitable bushings 34 so that the amount of water from the riser to each tier of pipes may be adjusted independently.

It will be apparent that with an automatic valve in the steam line 27 controlled by a thermostat in the hot water riser 19, the temperature of the water in the riser may be kept within very close limits and that by this arrangement water of a constant and common temperature is admitted to the heater at a plurality of stages through the valves 22 and tier connections 18. The milk admitted to the heater is thus heated quickly by the discharge of the hot water onto the milk tubes, and the milk as it passes through the tiers is heated to the temperature of the hot water as a maximum. Thus by adjusting the thermostat to control the steam intake so as to maintain the water in the riser 19 at a predetermined constant temperature, the milk will be heated up to a temperature closely approximating the temperature of the water quite independent of any variations in the temperature of the milk delivered to the heater, and will be discharged at an effectively maintained uniform temperature best adapted for efficient pasteurization.

The embodiment of the invention illustrated in Fig. 6 incorporates a modified means for effecting the distribution of the hot water and its discharge onto the milk tubes. In this form the intake pipes 18 which are fed from the common riser 19 are connected to longitudinally extending pipes 35, preferably positioned parallel to and above the milk tubes along one side of the heater body. A plurality of horizontally extending feeder pipes 36 are connected with each pipe 35 and extend transversely of and over the milk tubes. These feeder pipes are closed at their free ends and are provided with a plurality of discharge openings 37 in their under sides.

Each group of feeder pipes is arranged to discharge into a tray 38, corrugated in form and extending throughout the length of the heater, the corrugations being parallel to the milk tubes. As illustrated herein these trays may rest upon the headers 6 and are provided with discharge openings 39 positioned immediately above the milk tubes 5. Thus as illustrated in the drawings water discharged from the feeder pipes 36 through the openings 37 flows in the channels 40 of the trays 38 and is discharged therefrom onto the milk tubes through the openings 39, the trays being provided with end walls 41 to prevent discharge of the water at the ends.

I claim as my invention:

1. A heater comprising, in combination, a series of successively connected milk tubes, means to apply hot water onto said tubes, at a plurality of stages, a hot water heater, means to feed hot water from said heater simultaneously to the several stages in said applying means and means to regulate the heat input to said heater arranged to hold the outlet temperature of the water from the heater constant.

2. A heater of the character described comprising, in combination, a plurality of milk tubes arranged serially and in groups, means to apply hot water onto each group, a water heater, means to feed water from said heater individually to each of said groups and means adapted to regulate the heat input to said heater to hold the output temperature of the water from the water heater constant.

3. A heater comprising, in combination, a plurality of milk tubes arranged serially and in vertically spaced tiers, spraying means for each tier of tubes, a heater adapted to supply hot water for said spraying means, means to feed water from said heater independently to each spraying means, and means arranged to hold the output temperature of the water from said heater substantially constant.

4. A heater comprising, in combination, a plurality of milk tubes forming a single continuous passage, means to discharge hot water at uniform temperature onto said tubes for substantially their entire length, and means to heat said water comprising a steam operated heater, a valve arranged to control the admission of steam to said heater, an automatic device for operating said valve and a thermostat positioned in the outlet of said heater and associated with said automatic device.

5. A heater comprising, in combination, a casing, a plurality of milk tubes extending longitudinally in said casing and arranged in vertically disposed tiers, means for supporting said tubes arranged to connect the tubes to form a continuous passageway through the heater, a plurality of drip pans positioned one below each tier of tubes, said drip pans having drain openings vertically above each other, the lower-most pan being of sufficient capacity to receive the discharge from the remainder of the pans, and means to spray a heating medium onto said tubes, said means comprising a common riser, intake pipes fed independently from said riser for each tier of tubes, and means embodying a plurality of spray devices positioned along said tubes connected with each of said intake pipes.

6. A heater comprising, in combination, a plurality of milk tubes arranged serially and in groups, spraying means for each group of tubes, a water heater, means to feed water from said heater to each of said spraying means, individually controlled means to regulate the water supply to each spraying means and means responsive to the outlet temperature of the water from said heater arranged to control the heat input to the heater.

7. A heater comprising, in combination, a plurality of milk tubes arranged serially and in vertically disposed tiers, a plurality of water conduits in parallel tiers arranged to discharge hot water onto said tubes, a water heater, independently controlled connections from the outlet of said heater to each tier of conduits, a valve arranged to control the inlet of steam to said heater and a thermostatic device in the outlet of the heater arranged to control said valve.

8. A heater comprising, in combination, a continuous milk tube, means to discharge hot water against said tube substantially throughout its length, means for withdrawing the water discharged against any portion of said tube without its flowing over any other portion of said tube, means to heat said water, and means connecting the outlet of said heating means to said discharging means at a plurality of points along said tube.

9. A heater comprising, in combination, a plurality of milk tubes, means connecting said tubes to form a continuous passage, means to circulate milk through said passage, a water heater, means connected to the outlet of said water heater and arranged to apply water to said tubes at a plurality of stages, a valve arranged to control the flow of steam to said heater, and thermostatic means responsive to the temperature of the water discharged from the heater arranged to operate said valve.

10. A heater comprising, in combination, a casing, supporting means therefor, a plurality of milk tubes positioned horizontally in said casing and connected to form a continuous passage therethrough, a plurality of conduits arranged to discharge hot water onto said tubes, means to collect the water discharged onto the tubes, a water heater, means to distribute water from said heater to said water conduits at a plurality of stages, a valve arranged to control the inlet of steam to said heater, and thermostatic means responsive to the hot water leaving the heater arranged to operate said valve.

11. A heater comprising, in combination, a plurality of milk tubes arranged in vertically disposed horizontally extending tiers, means connecting said tubes to form a continuous passage therethrough, a plurality of conduits adjacent to and above said tubes and arranged to spray hot water onto the tubes, means to collect the discharged heating medium from each tier, a hot water heater, and means connecting the outlet of said heater to said conduits at each tier.

12. A heater comprising, in combination, a plurality of milk tubes arranged serially and in groups, means to discharge hot water onto each of said groups, means for withdrawing the spent water from each of said groups without contact with any other of said groups, means to supply water at uniform temperature and means to feed said water individually to said discharging means for each of said groups of tubes.

13. A heater comprising, in combination, a plurality of milk tubes arranged serially and in vertically spaced tiers, spraying means for each tier of tubes, a heater adapted to supply hot water for said spraying means, said tubes and spraying means being arranged so that the water is sprayed directly upon said tubes substantially throughout their length, means for diverting the water sprayed upon said tubes after having once made contact therewith, and means to feed water from said heater independently to each spraying means.

14. In a heater of the character described, the combination of a plurality of milk tubes arranged in a horizontal row, a drip pan positioned immediately below said tubes, and means to discharge a heating medium onto said tubes, said means comprising a corrugated tray extending longitudinally of and immediately above said tubes and having spray openings directed toward said tubes, and a feeder pipe having discharge openings positioned above said tray.

15. In a heater of the character described, the combination of a casing, a plurality of milk tubes arranged in longitudinally extending vertically disposed tiers, drip pans arranged one under each of said tiers, said drip pans having drain openings one above the other, the drain openings of the lower pans being successively larger, and means to spray hot water onto said tubes.

16. In a heater of the character described the combination of a plurality of milk tubes arranged serially and in vertically disposed groups, means to supply hot water at a substantially constant temperature, a plurality of groups of conduits arranged to apply water to said tubes, said tubes being arranged so that the water applied to any portion thereof will not flow over any other portion and connections from said supply means to each group of conduits.

17. In a heater of the character described, the combination of a casing, a plurality of milk tubes arranged serially and in vertically spaced tiers in said casing, means to spray the tubes of each tier individually with a heating medium, the tubes of each tier being positioned so that the heating medium will not flow from one upon another, and means for withdrawing the spent heating medium from each tier.

18. A heater comprising, in combination, a casing, a plurality of milk tubes arranged serially and in vertically disposed tiers in said casing, a plurality of conduits supported in parallel tiers arranged to discharge hot water onto said tubes, means to supply water at a uniform temperature, and independently controlled connections from said supply means to each tier of conduits.

19. A heater comprising, in combination, a plurality of milk tubes arranged serially and in tiers, a plurality of conduits arranged in parallel tiers and arranged to discharge hot water onto said tubes, individual drip pans under each tier of tubes, and means to supply water at a uniform temperature to each tier of conduits.

In testimony whereof I have hereunto affixed my signature.

JOSEPH H. GODFREY.